Patented May 20, 1941

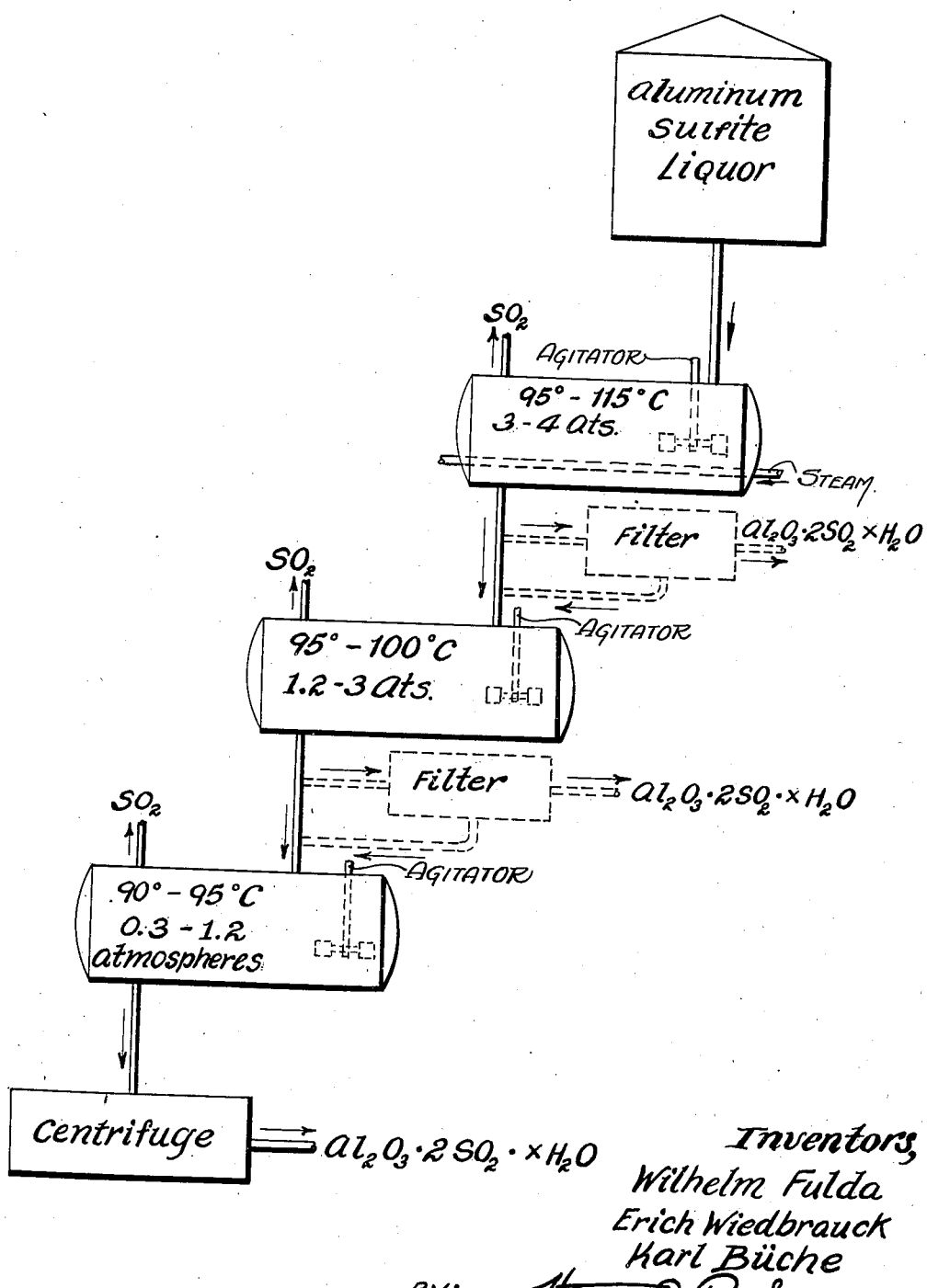

2,243,060

UNITED STATES PATENT OFFICE 2,243,060

MANUFACTURE OF MONOBASIC ALUMINUM SULPHITE

Wilhelm Fulda, Lautawerk, Lausitz, Erich Wiedbrauck, Essen-Bredeney, and Karl Büche, Essen-Rellinghausen, Germany, assignors, by mesne assignments, to Th. Goldschmidt Corporation, New York, N. Y., a corporation of Delaware Application October 31, 1938, Serial No. 238,102
In Germany November 3, 1937

6 Claims. (Cl. 23—129)

This invention relates to manufacture of monobasic aluminum sulphite; and it comprises a continuous process of recovering monobasic aluminum sulphite ($Al_2O_3 \cdot 2SO_2 \cdot xH_2O$) from solutions of aluminum sulphite wherein a body of reaction liquor is established and maintained under conditions of elevated temperature and pressure adapted to produce the rapid evolution of $SO_2$ and the formation of a granular precipitate of monobasic aluminum sulphite, the temperature of said body of liquor being above and the pressure being below those producing the formation of difficultly filtrable precipitates of higher basicity, continuously passing a raw liquor containing dissolved aluminum sulphite into said body of liquor, withdrawing evolved $SO_2$, withdrawing spent liquor together with the precipitated monobasic aluminum sulphite from said body of reaction liquor and recovering the precipitate, the said process being advantageously conducted in stages at successively lower temperatures and pressures; all as more fully hereinafter set forth and as claimed.

In the recovery of aluminum values from clay by the sulphite extraction process, wherein clay is extracted with sulphurous acid, concentrated pregnant solutions of aluminum sulphite are obtained which contain sufficient $SO_2$ to prevent the precipitation of any aluminum sulphites. It has been found to be somewhat difficult to recover the $SO_2$ and the aluminum sulphite from these solutions. The method used previously, as described in the U. S. Patent No. 1,971,668, was a batch process in which the pregnant liquor from the sulphite extraction process was passed into an autoclave, the latter was then slowly heated to drive off the $SO_2$ and to cause the precipitation of monobasic aluminum sulphite, the charge in the autoclave was then cooled and filtered to separate the precipitate from the liquor. This process has been found to be both time consuming and expensive. Considerable time was required both for the filling and the emptying of the autoclave. And it was found necessary in this process to heat the charge slowly in order to prevent the precipitation of sulphites of higher basicity which are extremely difficult to filter, a total heating time of about 3 hours being employed in the usual process. The total time required per batch, for example with an autoclave having a capacity of 20 cubic meters and with a charge having a volume of 18 cubic meters, was about 7 hours. The maximum yield of monobasic aluminum sulphite obtained in this manner was about 90 per cent, produced at the rate of about 80 kgm. per hour.

We have discovered that the recovery of monobasic aluminum sulphite from liquors containing dissolved aluminum sulphite can be conducted continuously with a substantial increase in efficiency and, under certain conditions, with an increase in yield. In this method a body of reaction liquor is established and maintained in an autoclave at elevated temperatures and at pressures adapted to cause the evolution of the excess $SO_2$ and the formation of a granular precipitate of monobasic aluminum sulphite, the liquor being passed continuously to and through said autoclave. The treatment of the raw liquor in this process can be conducted in one or more stages or steps. In the one-step process, for example, we have obtained excellent results, when using an autoclave having a cubic capacity of about 20 cubic meters, by maintaining a volume of about 18 cubic meters of reaction liquor in the autoclave and charging raw liquor continuously at a rate of about 6 cubic meters per hour, the spent liquor together with the precipitated monobasic aluminum sulphite being continuously discharged from the bottom of the autoclave at substantially the same rate. The autoclave is advantageously maintained under an excess pressure of from 3 to 4 atmospheres and at a temperature of about 100° C. or slightly above by direct or indirect heating. A yield of about 90 per cent $Al_2O_3$ is obtained.

The rapid heating of the liquor as it passes into the autoclave, as described above, does not cause the precipitation of aluminum sulphites of higher basicity, a granular precipitate of monobasic aluminum sulphite being obtained which is in excellent condition to be separated from the liquor either by filtration or by centrifugal force. This is a surprising result since, as stated above, if a body of the sulphite liquor is heated rapidly, more basic and difficultly filtrable precipitates are obtained. The explanation for this phenomenon possibly resides in the fact that, in the continuous process, the body of the liquor in the autoclave is much more dilute than the liquor entering the autoclave owing to the precipitation of the monobasic aluminum sulphite. In the continuous process the raw liquor as it enters the autoclave is heated almost instantaneously but it is simultaneously diluted and it is possible that this dilution prevents the expected precipitation of basic sulphites. It is equally possible, of course, that, under the particular conditions existing in the autoclave in the continuous process, a slight precipitation of basic sulphites does occur but that this precipitate later redissolves or is converted in some manner into the desired granular precipitate of monobasic aluminum sulphite. But whatever the true explanation, the fact remains that an aluminum sulphite liquor can be instantaneously heated without the formation of a precipitate of basic aluminum sulphite provided that it is passed into a body of heated reaction liquor whereas, if the same liquor is heated rapidly in bulk, such a precipitate will be formed.

We have found that best results are obtained in our process provided that the temperature within the autoclave is maintained within the range of about 90° to 115° C. and if the pressure is maintained within the range of slightly below atmospheric to about 5 atmospheres excess pressure. Under these conditions of temperature and pressure the excess $SO_2$ is rapidly evolved and the conditions are such that a granular precipitate is obtained which can be readily separated from the liquor. We have further found that higher yields can be obtained by the use of the higher temperatures within the range stated. A yield of up to 95 per cent, for example, is obtainable at temperatures ranging from about 110° to 115° C. But the use of these higher temperatures tends to cause the decomposition of the sulphurous acid present. This decomposition commences spontaneously at temperatures slightly above 100° C. and increases rapidly with rise of temperature. This decomposition appears to be autocatalytic since its rate increases with time. Large losses of $SO_2$ are likely to result from this decomposition. For this reason we prefer to employ temperatures in our process not substantially exceeding 100° C. We have also found that the yield of monobasic aluminum sulphite can be increased by the use of the lower pressures within the range stated. But the use of these lower pressures tends to cause the production of a precipitate which is too fine to be filtered easily. If high temperatures and low pressures are used simultaneously more basic sulphites are precipitated in amorphous form which are very difficult to separate from the reaction liquor. But we have found that these lower pressures can be employed, even pressures slightly below atmospheric pressure, provided that more dilute raw liquors are used. A reduction in temperature also tends to prevent the precipitation of difficulty filtrable precipitates and it is therefore usually desirable to reduce pressure and temperature simultaneously. These facts can be readily illustrated.

When an aluminum sulphite solution is employed which has a concentration ranging from about 30 to 45 grams per liter of $Al_2O_3$ and 150 to 250 grams per liter of $SO_2$, temperatures slightly above 100° C. and excess pressures within the range of 3 to 4 atmospheres can be employed with the production of the desired granular precipitate of monobasic aluminum sulphite. But if the original sulphite solution contains only 8 grams per liter of $Al_2O_3$, it is possible to reduce the excess pressure to as low as 1.2 atmospheres, with the use of a temperature of 100° C. and with the production of a satisfactory precipitate. If the $Al_2O_3$ content is reduced to 3 grams per liter, it is possible to reduce the excess pressure to about 0.3 atmosphere, provided that a temperature of about 95° C. is employed. The lower the pressure used in the process the greater the recovery of $Al_2O_3$ from the spent liquor, other factors being the same. But to obtain the benefit of this increased recovery it is evidently necessary to use raw liquors of lower concentration and usually to employ lower temperatures.

In our preferred process, in which monobasic aluminum sulphite is precipitated in steps or stages, use is made of the above phenomena in a very simple and satisfactory manner and without the necessity of diluting the concentrated pregnant liquors which are obtained in the sulphite extraction process. To dilute these concentrated liquors would result in an obvious loss of efficiency in the process. In our preferred step-by-step process the concentrated liquor is first passed into an autoclave usually maintained at temperatures in the neighborhood of 100° C. or slightly above and at pressures of about 3 to 4 atmospheres. The spent liquor from this autoclave is then sent either directly or after filtration to a second autoclave in which lower pressures and usually lower temperatures are employed. Owing to the precipitation of monobasic aluminum sulphite which occurs in the first autoclave, the concentration of the liquor passing into the second autoclave is sufficiently low to permit the use of substantially lower pressures in the latter. In this second autoclave the $Al_2O_3$ content is reduced still further and it is therefore possible to treat the spent liquor recovered from this autoclave at still lower pressures and temperatures. The final pressure used may even be subatmospheric but in this case temperatures below 100° C. must be used. This procedure can be repeated several times if desired but in general the additional expense involved in employing additional units will justify the use of no more than three autoclaves at a maximum. We have found that it is possible to increase the recovery of $Al_2O_3$ substantially by this step-by-step procedure. When a two-stage process is employed we have obtained yields as high as 95 per cent and, with a three-stage process, we have increased the yield up to about 98 per cent.

Even with the use of our continuous one-stage process described above the over-all efficiency of production obtained is considerably above that obtained with the former batch process. For example, with the batch process it is possible, when employing an autoclave having a capacity of about 20 cubic meters and a raw liquor containing 35 grams per liter of $Al_2O_3$ and 200 grams per liter of $SO_2$, to obtain for each batch approximately 2150 kilograms of monobasic aluminum sulphite (weighed moist), corresponding to 570 kilograms of $Al_2O_3$. This represents a yield of 90 per cent. But this procedure requires 7 hours and corresponds to a production of only 81 kilograms of $Al_2O_3$ per hour. In comparison we have found it possible to obtain, with the same raw liquor and the same apparatus operated in accordance with our continuous one-step process, a yield corresponding to 190 kilograms of $Al_2O_3$ per hour, an increase of efficiency of almost 250 per cent. This increase of efficiency is obtained without any increase in yield, the yield in both cases being about 90 per cent based on the $Al_2O_3$ content of the raw liquor. It is therefore obvious that, when the yield itself is increased, as in our step-by-step or multi-stage process, the efficiency obtained is still greater. Our improved process provides a method wherein yields of up to 98 per cent $Al_2O_3$ can be obtained and wherein the $SO_2$ in the original raw liquor is substantially recovered.

Our process can be explained in somewhat greater detail by reference to the accompanying drawing which shows, in the form of a flow chart, a one-step, a two-step and a three-step process within the present invention. The flow chart is supplied with appropriate legends and is believed to be self explanatory. As shown, an aluminum sulphite liquor, usually a pregnant liquor derived from the sulphite extraction process, is conducted to a first autoclave. Temperatures ranging from about 95° to 115° C. can be employed in this autoclave and excess pressures ranging from about 3 to 4 atmospheres can be used. The preferred temperature is about 100° C. and the pressure about 4 atmospheres. If it is desired to use our one-step process, the spent liquor from this autoclave, together with the precipitate of monobasic aluminum sulphite is passed directly to the filter shown in dotted lines where the precipitate is recovered. If a two-step or a three-step process is to be employed the spent liquor from the first autoclave may be passed directly to the second autoclave, as shown by the full lines in the figure or it may be passed through the filter first for removal of its precipitate of monobasic aluminum sulphite and then passed to the second autoclave, as shown by the dotted lines.

In the second autoclave somewhat lower temperatures and pressures should be employed than in the first autoclave. The temperatures used may range from about 95° to 100° C., for example, and the excess pressures from 1.2 to 3 atmospheres. The spent liquor from the second autoclave may be passed through the filter, as shown by the dotted lines, for removal of its content of monobasic aluminum sulphite, as in our two-step process, or it can be passed to the third autoclave in which still lower temperatures and pressures should be employed, for example, temperatures ranging from about 90° to 95° C. and excess pressures ranging from about 0.3 to 1.2 atmospheres. If temperatures as low as 90° C. are employed in this third autoclave the pressure may be reduced even below atmospheric. The temperatures and pressures indicated on the flow chart are, of course, only illustrative.

Our invention is further exemplified by the following specific examples which represent preferred embodiments of our process as used in actual practice.

*Example 1*

In this example a stirring autoclave was employed having a cubic capacity of 20 cubic meters. A stream of an aluminum sulphite liquor containing 35 grams per liter of $Al_2O_3$ and 200 grams per liter of $SO_2$ was passed continuously through the autoclave at a rate of 6 cubic meters per hour. The liquor was withdrawn from the bottom at such a rate that a body of reaction liquor was maintained in the autoclave having a volume of about 18 cubic meters. This body of liquor was continuously agitated and maintained at a temperature of 100° C. by a steam heating coil. The pressure in the autoclave was maintained at 4 atmospheres, the evolved $SO_2$ being vented at such a rate as to maintain this pressure, this rate amounting to about 700 kilograms of $SO_2$ per hour. The spent liquor was withdrawn at a rate of about 5.8 cubic meters per hour and passed through a centrifuge in which the precipitate, amounting to 710 kilograms of moist monobasic aluminum sulphite containing 26.3 per cent of $Al_2O_3$, was removed. This represents a yield of 89 per cent or 187 kilograms of $Al_2O_3$ per hour. The remaining liquor was found to contain 4 grams per liter of $Al_2O_3$ and 40 grams per liter of $SO_2$.

*Example 2*

In this example two stirring autoclaves were employed having capacities of 12 cubic meters. These were connected in series. An aluminum sulphite liquor containing 45 grams per liter of $Al_2O_3$ and 200 grams per liter of $SO_2$ was passed in series through these autoclaves at a rate of 6 cubic meters per hour. The spent liquor was withdrawn at a rate such as to maintain a body of liquor in each autoclave having a volume of about 10 cubic meters, this body of liquor being maintained at a temperature of 100° C. The pressure maintained in the first autoclave was 4 atmospheres while the second was maintained at 1.2 atmospheres excess pressure. It was found that, in the first autoclave, about 80 per cent of the original content of $Al_2O_3$ in the raw liquor was precipitated as monobasic aluminum sulphite while about 450 kilograms of $SO_2$ were evolved. The spent liquor from the first autoclave, together with the precipitate of monobasic aluminum sulphite, was passed directly to the second autoclave, this liquor containing about 9 grams per liter of $Al_2O_3$. In the second autoclave 250 kilograms of $SO_2$ were released per hour. The spent liquor was drawn off from this autoclave at a rate of about 5.8 cubic meters per hour, this liquor still containing 2 grams per liter of $Al_2O_3$ and 30 grams per liter of $SO_2$. This liquor with its content of precipitated monobasic aluminum sulphite was passed through a filter. 960 kilograms of monobasic aluminum sulphite were recovered per hour, this corresponding to a yield of 95 per cent.

*Example 3*

In this example three stirring autoclaves were employed having capacities of 12 cubic meters. The raw aluminum sulphite liquor employed had a concentration of 45 grams per liter of $Al_2O_3$ and 200 grams per liter of $SO_2$. This liquor was passed through the three autoclaves in series at a rate of 6 cubic meters per hour. A body of reaction liquor having a volume of about 10 cubic meters was maintained in each autoclave, this liquor being kept in a state of continuous agitation. The pressures and temperatures employed in the three autoclaves were as follows:

1st autoclave_____ 100° C. and 4 atmospheres excess pressure.
2nd autoclave_____ 100° C. and 1.2 atmospheres excess pressure.
3rd autoclave_____ 95° C. and 0.3 atmosphere excess pressure.

It was found that 80 per cent of the $Al_2O_3$ content of the raw liquor was precipitated in the first autoclave, 15 per cent in the second and about 3 per cent in the third, representing a total yield of about 98 per cent. In the first autoclave 450 kilograms of $SO_2$ were evolved per hour, in the second 250 kilograms per hour and in the third 50 kilograms per hour. The spent liquor was drawn off from the bottom of the third autoclave at a rate of about 5.8 cubic meters per hour and was found to contain only 0.8 gram per liter of $Al_2O_3$ and 20 grams per liter of $SO_2$. A total of 990 kilograms of monobasic aluminum sulphite were recovered per hour by passing the spent liquor through a centrifuge.

The precipitates of monobasic aluminum sulphite obtained in the above specific examples were found to be granular and in such a state that they could be readily removed from the mother liquor either by filtration or by use of a centrifuge.

While we have described what we consider to be the best embodiments of our invention, it is evident that many modifications can be made in the specific procedures described without departing from the purview thereof. It is evident, for example, that our process is applicable to the recovery of monobasic aluminum sulphite from any liquor containing aluminum sulphite in solution therein. Various sizes and types of autoclaves can be employed in the process. The liquor should be retained in the autoclave for a time only sufficient to produce maximum precipitation under the conditions employed. The rate of flow of the raw liquor through the autoclave or series of autoclaves can be readily varied to determine the optimum rate of flow to produce the maximum yield or the maximum rate of recovery. The number of autoclaves to be employed in series can, of course, be varied widely, the optimum number to be employed in a given instance depending upon the economics of the process rather than upon any limitations inherent in the process itself. The temperatures and pressures used in our process are capable of being varied rather widely but best results are obtained at temperatures not substantially exceeding 100° C. and at pressures not substantially exceeding 5 atmospheres. The pressures employed should be sufficient to ensure the presence of at least about 2 moles of $SO_2$ in the reaction liquor for each mole of $Al_2O_3$. If desired the raw liquor can be preheated before being passed into the first autoclave. And heat exchange can be employed between the hot spent liquor and the incoming raw liquor if desired. Various other modifications which fall within the scope of the following claims will be immediately evident to those skilled in this art.

What we claim is:

1. In the process of preparing granular, easily-filtered monobasic aluminum sulphite in high yield from aluminum sulphite solutions, the steps which comprise forming and precipitating monobasic aluminum sulphite in a first stage in granular form from a concentrated solution of aluminum sulphite by heating it under elevated temperatures and superatmospheric pressures, then forming and precipitating additional monobasic aluminum sulphite in at least one additional stage from the resulting less concentrated liquor while maintaining said less concentrated liquor at approximately the same temperature but under a pressure substantially lower than that employed in said first stage, whereby monobasic aluminum sulphite is formed and precipitated in granular, easily-filtered form in spite of the lower pressure employed in said additional stage; the pressures of $SO_2$ employed in said process being within the range of about 5 atmospheres to a pressure slightly below atmospheric pressure and the temperatures employed in the first two stages of the process being approximately 100° C.

2. In the process of preparing granular, easily-filtered monobasic aluminum sulphite in high yield from aluminum sulphite solutions, the steps which comprise forming and precipitating monobasic aluminum sulphite in a first stage in granular form from a concentrated solution of aluminum sulphite by heating it under elevated temperatures and superatmospheric pressures, within the ranges of about 95° to 115° C. and 3 to 4 atmospheres, respectively, then forming and precipitating additional monobasic aluminum sulphite in at least one additional stage from the less concentrated liquor derived from said first stage while maintaining said less concentrated liquor at approximately the same temperature but under pressure of $SO_2$ substantially below those employed in said first stage, whereby monobasic aluminum sulphite is formed and precipitated in granular, easily-filtered form in spite of the lower pressure employed in said additional stage; the pressures employed in said additional stage being within the range of about 3 atmospheres to a pressure slightly below atmospheric pressure.

3. In the process of preparing granular, easily-filtered monobasic aluminum sulphite in high yield from aluminum sulphite solutions, the steps which comprise passing a concentrated solution of aluminum sulphite into a first precipitation zone maintained at temperatures within the range of about 95° to 115° C. and under pressures of $SO_2$ within the range of about 3 to 4 atmospheres, whereby monobasic aluminum sulphite is formed and precipitated in granular, easily-filtered form, passing the resulting less concentrated solution of aluminum sulphite into a second precipitation zone maintained at approximately the same temperature but at a lower pressure within the range of about 1.2 to 3 atmospheres, whereby monobasic aluminum sulphite is again formed and precipitated in granular, easily-filtered form in spite of the lower pressure employed in said second zone; and recovering the precipitated monobasic aluminum sulphite.

4. In the process of preparing granular, easily-filtered monobasic aluminum sulphite in high yield from aluminum sulphite solutions, the steps which comprise passing a concentrated solution of aluminum sulphite into a first precipitation zone maintained at temperatures within the range of about 95° to 115° C. and under pressures of $SO_2$ within the range of about 3 to 4 atmospheres, passing the resulting less concentrated solution of aluminum sulphite into a second precipitation zone maintained at substantially the same temperature but at a lower pressure within the range of about 1.2 to 3 atmospheres, passing the resulting still less concentrated solution into a third precipitation zone maintained at a pressure within the range of of about 0.3 to 1.2 atmospheres and at a temperature within the range of about 90° to 95° C., whereby monobasic aluminum sulphite is formed and precipitated in each of said precipitation zones in granular, easily-filtered form in spite of the low pressures employed in said second and third zones.

5. The process of claim 3 wherein the precipitated monobasic aluminum sulphite is removed from the less concentrated aluminum sulphite solution passing to said second precipitation zone.

6. The process of claim 4 wherein the precipitated monobasic aluminum sulphite is passed from zone to zone and is removed from the liquor passing out of the final precipitation zone.

WILHELM FULDA.
ERICH WIEDBRAUCK.
KARL BÜCHE.